(12) United States Patent
Legrand

(10) Patent No.: US 8,750,389 B2
(45) Date of Patent: Jun. 10, 2014

(54) VIDEO DATA DECODER AND METHOD FOR DECODING VIDEO DATA

(75) Inventor: Mickaël Legrand, Rueil Malmaison (FR)

(73) Assignee: Sagem Communications SAS, Rueil Malmaison (FR)

( * ) Notice: Subject to any disclaimer, the term of this patent is extended or adjusted under 35 U.S.C. 154(b) by 454 days.

(21) Appl. No.: 12/812,951

(22) PCT Filed: Dec. 31, 2008

(86) PCT No.: PCT/FR2008/052436
§ 371 (c)(1),
(2), (4) Date: Oct. 12, 2010

(87) PCT Pub. No.: WO2009/090353
PCT Pub. Date: Jul. 23, 2009

(65) Prior Publication Data
US 2011/0026602 A1    Feb. 3, 2011

(30) Foreign Application Priority Data
Jan. 18, 2008  (FR) ..................................... 08 50347

(51) Int. Cl.
*H04N 7/12*        (2006.01)
*H04N 11/02*       (2006.01)
*H04N 21/43*       (2011.01)

(52) U.S. Cl.
CPC ................................ *H04N 21/4302* (2013.01)
USPC ..................................... 375/240.28; 348/464

(58) Field of Classification Search
None
See application file for complete search history.

(56) References Cited

U.S. PATENT DOCUMENTS

| 7,289,718 | B2* | 10/2007 | Sugahara et al. | 386/337 |
| 2002/0150126 | A1* | 10/2002 | Kovacevic | 370/503 |
| 2005/0185929 | A1* | 8/2005 | Kang et al. | 386/95 |
| 2006/0212902 | A1* | 9/2006 | Seo et al. | 725/39 |
| 2007/0280301 | A1* | 12/2007 | Yamanaka | 370/503 |

FOREIGN PATENT DOCUMENTS

EP          1 443 773 A       8/2004

OTHER PUBLICATIONS

International Search Report as issued for PCT/FR2008/052436, dated Feb. 5, 2010.

* cited by examiner

*Primary Examiner* — Sath V Perungavoor
*Assistant Examiner* — Kate Luo
(74) *Attorney, Agent, or Firm* — Pillsbury Winthrop Shaw Pittman LLP

(57) ABSTRACT

A decoder includes a storage space that records video data and subtitle data in multiplexed form; a first buffer memory operating in "First In First Out" mode and able to temporarily contain the video data in packet form; a second buffer memory operating in "First In First Out" mode and able to temporarily contain the subtitle data in packet form; a demultiplexer configured to transmit the video data and subtitle data respectively to the first and second buffer memories; and a local clock, wherein the storage space includes a storage space configured to store the time references such that the demultiplexer transmits the time references, the decoder including a generator to generate a presentation time stamp associated with each subtitle data packet not initially containing a presentation time stamp, the presentation time stamp being determined from a time reference value transmitted by the demultiplexer and enabling the presentation of the subtitle data packets to be synchronized with relation to the local clock.

16 Claims, 1 Drawing Sheet

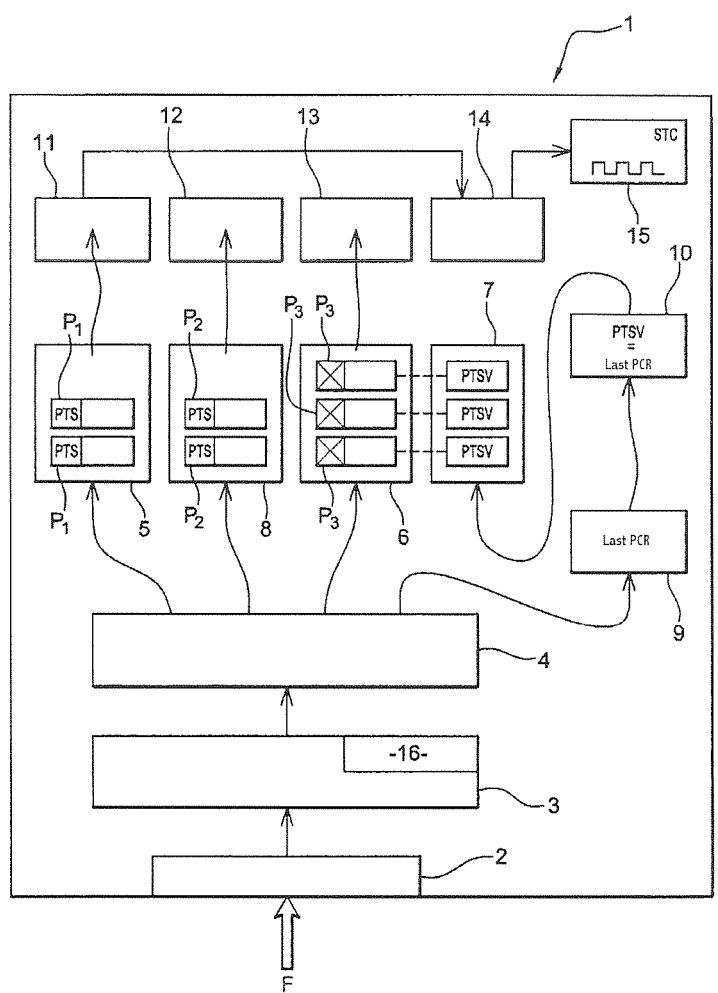

VIDEO DATA DECODER AND METHOD FOR DECODING VIDEO DATA

CROSS-REFERENCE TO RELATED APPLICATIONS

This is the U.S. National Stage of PCT/FR2008/052436, filed Dec. 31, 2008, which in turn claims priority to French patent application Ser. No. 08/50347, filed Jan. 18, 2008, the entire contents of all applications are incorporated herein by reference in their entireties.

TECHNICAL FIELD OF THE INVENTION

The present invention relates to a video data decoder (called also setup-box) and to a method for decoding these data. The invention applies to the field of digital television decoders developed to decode video data and comprising means for synchronizing video, subtitle and audio data (when the latter are present), these data being recorded in a storage space (of the hard disk type) in multiplexed form. It will be noted that the term "subtitle" utilized below designates any type of textual data intended to accompany video data; it may, for example, refer to subtitles defined according to the DVB (Digital Video Broadcasting) standard but also to data utilizing the teletext standard (transported over DVB packets, for example).

TECHNOLOGICAL BACKGROUND OF THE INVENTION

In a digital television decoder comprising a hard disk, various flows of the audio, video and teletext/subtitle type such as described, among others, in the DVB standards may be stored in partial flow form on the hard disk, in order to be subsequently replayed and decoded.

These various flows are usually transported in a flow transport utilizing, for example, the DVB standard, demultiplexed by a demultiplexer and transmitted respectively to elementary decoders for audio, video, teletext or subtitle decoding. Flows transmitted to a decoding device may be intended for synchronous use. This is, for example, the case with audio and video data that are interconnected by time synchronization data in the form of presentation time stamps (PTS). The operation of these data, combined with the updating of a local system time clock (STC) by means of time reference signals noted PCR (Program Clock Reference), enable images to be displayed synchronously with sound. The PCR time references are inserted in the data flow in synchronism with a clock that synchronizes the coding of data. They enable, by using a frequency synthesizer or a voltage controlled oscillator noted VCXO (Voltage Controlled Crystal Oscillator), the generation on the decoding side of the STC clock. The PTS time stamps enable the presentation of data packets to be synchronized with relation to the STC clock. Although video decoding and audio decoding are separate processes, each video packet and each audio packet is synchronized with the STC clock such that they are presented at the same given time. In other words, the video and audio packets are each synchronized with the STC clock and are therefore synchronized therebetween. This method is well known and implemented in digital decoders.

It will be noted that the transmission of PTS synchronization data is not obligatory in the case of subtitle/teletext data. Synchronization of such data, the need for which is much less precise than in the case of audio data, is carried out by an almost-immediate (a few tens of ms at most) decoding of the data received at the output of the demultiplexer. Because of this, with regard to the operation of subtitle flows in direct decoding mode according to an antenna signal, the presence or not of synchronization data in these flows being of little interest, the taking into account of an average error is sufficient to improve accuracy.

However, the implementation of such a solution poses a certain number of difficulties in the case of a decoder comprising a data storage space.

Thus, the principle generally utilized during the playback of data replayed from a storage space consists of buffering (that is, storing in buffer memory) the data utilized, by notably filling to the maximum the buffer memory with video data. From this point on, either the term "buffer memory" or the term "buffer" will be used. The buffers utilized are of the FIFO "First In First Out" type. In this manner, a possible malfunction in reading on the storage space (such as a disk read error, for example) resulting in a delay in the reading of these data is not obvious. Thus, all of the audio, video and subtitle data played back from a storage space is provided to the demultiplexer, with control managed by the fill level of the video decoding buffer.

In the case where no before sending PTS time stamp is implemented for subtitles, the subtitles are decoded as soon as they are available at the output of the demultiplexer, in the same manner as in direct receipt. Video data not yet decoded therefore risk being still present in the video decoding buffer, while the corresponding subtitles are already being displayed. In practice, the size of the video decoding buffer and the usual video compression rates are such that it is possible to have an interval of several seconds between these subtitles and the image that has not yet been decoded. The display consistency of subtitles with relation to the video is then seriously compromised. Consequently, it is understood that the fact of immediately (without buffering) playing the subtitles without PTS presentation time stamps does not pose a major problem when data are played "live," but that this absence of buffering poses serious problems in the case of reading data from a hard disk incorporated in the decoder. It will be noted that the term "live" utilized from this point on designates live displaying, from the flow and not from the hard disk.

In addition, in the absence of presentation time stamps associated with subtitle data, the problems mentioned above are further increased in idle mode inasmuch as the delay between the display of the subtitles and that of the video images is even longer.

GENERAL DESCRIPTION OF THE INVENTION

In this context, the present invention aims to provide a decoder of video data and subtitle data associated with said video data coming from a storage space, enabling the video data and subtitle data to be synchronized efficiently, simply and economically.

For this purpose, the invention proposes a decoder of video data and subtitle data associated with said video data, said data coming from a flow of data also including PCR time references in synchronism with a clock used to synchronize the coding of said data, said decoder comprising
  a storage space, said video data and subtitle data being recorded in multiplexed form on said storage space,
  a first buffer memory operating in "First In First Out" mode and able to receive said video data in packet form,
  a second buffer memory operating in "First In First Out" mode and able to receive said subtitle data in packet form, a demultiplexer to transmit said video data and said subtitle data respectively to said first and said second buffer memory, a local clock, said decoder being characterized in that said storage space comprises means to store said time references such that said demultiplexer also transmits said time references, said decoder including means to generate a presentation time stamp associated with each subtitle data packet not initially containing a presentation time stamp, said presentation time stamp being determined from a time reference value transmitted by said demultiplexer and enabling the presentation of said subtitle data packets to be synchronized with relation to said local clock.

Thanks to the invention, a reconstructed time stamp is associated with each subtitle packet not having a PTS time stamp (enabling synchronization); this reconstructed time stamp is generated from a PCR time reference. Therefore, during a disk read, the invention enables the subtitles to be synchronized even if they do not contain PTS, that is to say, even if they were not provided for that purpose.

The device according to the invention may also present one or more of the characteristics below, considered individually or according to all technically possible combinations.

According to a first preferential embodiment, the decoder according to the invention comprises means for storing a time reference variable equal to the last time reference received from said multiplexer, said means to generate a presentation time stamp setting the value of said presentation time stamp of each subtitle data packet received in said second buffer memory at the current value of said time reference variable.

According to a second embodiment, the decoder according to the invention comprises means for storing a time reference variable equal to the last time reference received from said multiplexer, said means to generate a presentation time stamp setting the value of said presentation time stamp of each subtitle data packet received in said second buffer memory at the value that follows the current value of said time reference variable at the time of receipt of said packet in said second buffer memory.

According to a third embodiment, the decoder according to the invention comprises means for storing a time reference variable equal to the last time reference received from said multiplexer, said means to generate a presentation time stamp setting the value of said presentation time stamp of each subtitle data packet received in said second buffer memory at a combination of the current value of said time reference variable and the value that follows the current value of said time reference variable at the time of receipt of said packet in said second buffer memory.

In a particularly advantageous manner, the decoder according to the invention comprises a third buffer memory operating in "First In First Out" mode and able to temporarily contain said generated presentation time stamps, said third buffer memory containing as many time stamps as the number of subtitle data packets not initially containing presentation time stamps found in said second buffer memory.

According to an embodiment, said video data and subtitle data are stored in said storage space in DVB format.

Preferentially, the decoder according to the invention comprises a fourth buffer memory operating in "First In First Out" mode and able to temporarily contain audio data, said audio data also coming from said data flow also including the video data, subtitle data and time references.

Advantageously, the decoder according to the invention is a digital television decoder.

Another object of the present invention is a method of decoding video data and subtitle data associated with said video data, said data coming from a data flow also including time references in synchronism with a clock used to synchronize the coding of said data, said video and subtitle data and said time references being recorded in multiplexed form on a storage space, said method comprising the following steps:

demultiplexing of said video data, said subtitle data and said time references, storing said video data in packet form in a first buffer memory operating in "First In First Out" mode, storing said subtitle data in packet form in a second buffer memory operating in "First In First Out" mode, storing a time reference variable equal to the last time reference received from said multiplexer, storing in a third buffer memory operating in "First In First Out" mode a presentation time stamp associated with each subtitle data packet entering in said second buffer memory and not initially containing a presentation time stamp, said time stamp being equal to the value of the last stored time reference and enabling the presentation of said subtitle packets to be synchronized with relation to a local clock.

BRIEF DESCRIPTION OF THE FIGURES

Other characteristics and advantages of the invention will clearly emerge from the description given below, for indicative and in no way limiting purposes, with reference to the attached FIG. 1 that is a simplified schematic representation of a decoder according to the invention for implementing the coding method according to the invention.

DESCRIPTION OF PREFERRED EMBODIMENTS OF THE INVENTION

FIG. 1 schematically represents a digital television decoder 1 provided to receive data flows F (utilizing, for example, a DVB type standard). Decoder 1 enables audiovisual programs to not only be broadcast live to the television viewer, but also enables them to be recorded on a storage space such as a hard disk 3 so as to make them accessible to the television viewer later. It will be noted that FIG. 1 only represents functionalities relative to the embodiment connected to the storage of data.

Decoder 1 comprises:
 a module for receiving 2 the data flow F
 the hard disk 3,
 a demultiplexer 4,
 four buffer memories 5, 6, 7 and 8,
 three decoders 11, 12 and 13 respectively provided to decode video, audio and subtitle data.

Each of the buffer memories 5, 6, 7 and 8 is a buffer of the FIFO "First In First Out" type.

After the data flow F is received by the reception module 2, the flow is stored on the hard disk 3.

Flow F comprises a set of video, audio and subtitle data. Flow F also comprises time reference signals noted PCR (Program Clock Reference). These PCR time references are inserted in the data flow in synchronism with a clock that synchronizes the coding of data. In "live" read, the PCR enable, by using a frequency synthesizer or a voltage controlled oscillator noted VCXO (Voltage Controlled Crystal Oscillator), the generation on the decoding side of an STC synchronization clock. In the case of reading from the hard disk 3, the time references are not utilized to generate the STC clock: however, hard disk 3 comprises means 16 to store the PCR references incorporated in flow F in a memory.

As we explained with reference to the prior art, the audio and video data each comprise time synchronization data in PTS (Presentation Time Stamps) form. Thus, after demultiplexing of the flow F by demultiplexer 4, the video data packets P1 each comprising a PTS time stamp are sent to the buffer memory 5. In addition, the audio data packets P2 each comprising a PTS time stamp are sent to the buffer memory 8.

Decoder 1 also comprises an STC (System Time Clock) local clock 15 for synchronization and means 14 to generate said STC clock 15. The manner of generating the STC clock 15 is different depending on whether one is "live" or reading the hard drive 3.

Thus, as we explained with reference to the prior art, when live, the STC clock is generated thanks to the PCR time references received in the flow, and the video and audio packets are synchronized on the STC clock (i.e., the PTS time stamps of the packets received are compared to the STC clock to know the right time to play the data packet).

In disk read, as the flow arrives at an artificial speed, the PCR time references are not reliable values. Consequently, the video packets are not synchronized and the video decoder 11 will thus no longer take into account the PTS time stamp present in each video packet; On the other hand, the video decoder 11 will inform the means 14 for generating the STC clock 15 of the PTS time stamp value associated with each image displayed. This PTS time stamp will then be used to generate the STC local clock 15. As in "live," the audio packets are going to be synchronized on clock 15. This method is a method known by the name "video master."

It will be noted that it is also possible to use PTS time stamps of audio packets to generate the STC clock. This method is known by the name "audio master."

As said above, the transmission of PTS synchronization data is not obligatory in the case of subtitle/teletext data. In order to illustrate the invention, here we will only deal with the case of P3 subtitle packets not comprising PTS time stamps (the absence of PTS is illustrated by the presence of X in the P3 packets). These P3 packets are transmitted by the demultiplexer 4 to the buffer memory 6.

Decoder 1 comprises means 9 for storing a time reference variable equal to the last PCR time reference received by the multiplexer 4: In other words, means 9 enable permanent access to the last PCR value.

Decoder 1 also comprises means 10 to generate a presentation time stamp associated with each P3 subtitle data packet received in the buffer memory 6.

Thus, at each receipt of a P3 packet in buffer memory 6, means 10 will interrogate the storage means 9 and set the time stamp value associated with the P3 packet to the last PCR value received (i.e., the current value of the time reference variable). Thus, a virtual (or reconstructed) PTSV time stamp is created equal to the last value received of each PCR reference value.

Each of the PTSV time stamps is entered in the buffer memory 7.

It is understood that the subtitle packet buffer memory 6 comprises as many subtitle packets without STC time stamps as the number of PTSV virtual time stamps contained in buffer memory 7.

The presence of a time stamp associated with the subtitle packet enables the subtitle data decoder 13 to synchronize the subtitle data on the STC local clock 15.

It will be noted that the PCR references arrive much more often (at least every 100 ms in the DVB standard) than the subtitle packets. Consequently, it clearly appears that each PTSV virtual time stamp will take a different PCR value and that many PCR values will not be utilized by the means 10 for generating PTSVs.

The video data buffer 5 is designed to be permanently full, inducing by this fact a delay of several seconds (the value of this delay is directly dependent on the size of the video buffer 5 and on the video rate) between the entrance of a packet and its exit. Consequently, the time given by a PCR reference that has just been received is in advance of these several seconds with relation to the STC local clock 15 generated from the video images coming from decoder 11. Consequently, the fact of assigning the value of the last PCR received to the time stamp of each subtitle packet constitutes a good approximation and enables a result that is practically as synchronized as a "live" read to be obtained.

Of course, the invention is not limited to the embodiment that has just been described.

In particular, the means represented in FIG. 1 are functional units that may or may not correspond to physically distinguishable units. For example, these means may be regrouped into a single component, or constitute functionalities of the same software. On the contrary, certain means may possibly be composed of separate physical entities.

In addition, we have described an embodiment in which the value of the virtual time stamp is set at the value of the last PCR reference received. One may, however, consider using another PCR value than the last value received. For example, it may be the reference received immediately after receipt of the subtitle packet or a combination (average) of the last value received and the next value received.

In addition, we have indicated the presence of a buffer intended to store PTSV virtual time stamps. One may also consider modifying the subtitle packet (by, in particular, increasing its size) upstream from its entrance in the subtitle data buffer memory in order to directly assign it the PTSV virtual time stamp.

Lastly, any means may be replaced by an equivalent means.

The invention claimed is:

1. A decoder of video data and subtitle data associated with said video data, said data coming from a flow of data including PCR time references in synchronism with a clock used to synchronize the coding of said data, said decoder comprising:
   a storage space, said video data and subtitle data being recorded in multiplexed form on said storage space;
   a first buffer memory operating in "First In First Out" mode and able to temporarily contain said video data in packet form;
   a second buffer memory operating in "First In First Out" mode and able to temporarily contain said subtitle data in packet form;
   a demultiplexer configured to transmit said video data and said subtitle data respectively to said first and said second buffer memory; and
   a local clock,
   wherein said storage space comprises means to store said PCR time references such that said demultiplexer transmits said PCR time references, said decoder including means to generate a presentation time stamp associated with each subtitle data packet not initially containing a presentation time stamp, said presentation time stamp being determined from a time reference value of a PCR time reference among said PCR time references and transmitted by said demultiplexer and enabling the presentation of said subtitle data packets to be synchronized with relation to said local clock, wherein the decoder comprises means for storing a time reference variable equal to the last time reference received from said multiplexer, said means to generate a presentation time stamp setting the value of said presentation time stamp of each subtitle data packet received in said second buffer memory at the current value of said time reference variable.

2. The decoder according to claim 1, wherein the decoder comprises a third buffer memory operating in "First In First Out" mode and able to temporarily contain said generated presentation time stamps, said third buffer memory containing as many time stamps as the number of subtitle data packets not initially containing the presentation time stamp found in said second buffer memory.

3. The decoder according to claim 1, wherein said storage space is provided so that said video and subtitle data are stored in a DVB format.

4. The decoder according to claim 1, wherein the decoder comprises a fourth buffer memory operating in "First In First Out" mode and able to temporarily contain audio data, said audio data also coming from said data flow also including the video data, subtitle data and time references.

5. The decoder according to claim 1, wherein said decoder is a digital television decoder.

6. The decoder according to claim 1, wherein the presentation time stamp is added into those subtitle data packets not initially containing a presentation time stamp and wherein those subtitle data packets with the presentation time stamp added are stored in the second buffer.

7. The decoder according to claim 1, wherein upon receipt of a PCR time reference from the means to store said PCR time references by the demultiplexer, the demultiplexer transmits the received PCR time reference to and updates content of the means for storing a time reference variable to the received PCR time reference.

8. The decoder according to claim 1, wherein upon receipt of a packet of said subtitle data by the second buffer memory, the means to generate a presentation time stamp interrogates the means for storing a time reference variable and receives the time reference variable stored therein.

9. A decoder of video data and subtitle data associated with said video data, said data coming from a flow of data including PCR time references in synchronism with a clock used to synchronize the coding of said data, said decoder comprising:
a storage space, said video data and subtitle data being recorded in multiplexed form on said storage space;
a first buffer memory operating in "First In First Out" mode and able to temporarily contain said video data in packet form;
a second buffer memory operating in "First In First Out" mode and able to temporarily contain said subtitle data in packet form;
a demultiplexer configured to transmit said video data and said subtitle data respectively to said first and said second buffer memory; and
a local clock,
wherein said storage space comprises means to store said PCR time references such that said demultiplexer transmits said PCR time references, said decoder including means to generate a presentation time stamp associated with each subtitle data packet not initially containing a presentation time stamp, said presentation time stamp being determined from a time reference value of a PCR time reference among said PCR time references and transmitted by said demultiplexer and enabling the presentation of said subtitle data packets to be synchronized with relation to said local clock, wherein the decoder comprises means for storing a time reference variable equal to the last time reference received from said multiplexer, said means to generate a presentation time stamp setting the value of said presentation time stamp of each subtitle data packet received in said second buffer memory at the value that follows the current value of said time reference variable at the time of receipt of said packet in said second buffer memory.

10. The decoder according to claim 9, wherein the presentation time stamp is added into those subtitle data packets not initially containing a presentation time stamp and wherein those subtitle data packets with the presentation time stamp added are stored in the second buffer.

11. A decoder of video data and subtitle data associated with said video data, said data coming from a flow of data including PCR time references in synchronism with a clock used to synchronize the coding of said data, said decoder comprising:
a storage space, said video data and subtitle data being recorded in multiplexed form on said storage space;
a first buffer memory operating in "First In First Out" mode and able to temporarily contain said video data in packet form;
a second buffer memory operating in "First In First Out" mode and able to temporarily contain said subtitle data in packet form;
a demultiplexer configured to transmit said video data and said subtitle data respectively to said first and said second buffer memory; and
a local clock,
wherein said storage space comprises means to store said PCR time references such that said demultiplexer transmits said PCR time references, said decoder including means to generate a presentation time stamp associated with each subtitle data packet not initially containing a presentation time stamp, said presentation time stamp being determined from a time reference value of a PCR time reference among said PCR time references and transmitted by said demultiplexer and enabling the presentation of said subtitle data packets to be synchronized with relation to said local clock, wherein the decoder comprises means for storing a time reference variable equal to the last time reference received from said multiplexer, said means to generate a presentation time stamp setting the value of said presentation time stamp of each subtitle data packet received in said second buffer memory at a combination of the current value of said time reference variable and the value that follows the current value of said time reference variable at the time of receipt of said packet in said second buffer memory.

12. The decoder according to claim 11, wherein the presentation time stamp is added into those subtitle data packets not initially containing a presentation time stamp and wherein those subtitle data packets with the presentation time stamp added are stored in the second buffer.

13. A method of decoding video data and subtitle data associated with said video data, said data coming from a data flow including PCR time references in synchronism with a clock used to synchronize the coding of said data, said video and subtitle data and said PCR time references being recorded in multiplexed form on a storage space, said method comprising:
demultiplexing said video data, said subtitle data and said time references;
storing said video data in packet form in a first buffer memory operating in "First In First Out" mode;
storing said subtitle data in packet form in a second buffer memory operating in "First In First Out" mode;
storing a time reference variable equal to the last PCR time reference received from said multiplexer;

storing in a third buffer memory operating in "First In First Out" mode a presentation time stamp associated with each subtitle data packet entering in said second buffer memory and not initially containing a presentation time stamp, said time stamp being equal to the value of the last stored PCR time reference and enabling the presentation of said subtitle packets to be synchronized with relation to a local clock.

14. A decoder of video data and subtitle data associated with said video data, said data coming from a flow of data including PCR time references in synchronism with a clock used to synchronize the coding of said data, the decoder comprising:
  a storage space, said video data and subtitle data being recorded in multiplexed form on said storage space;
  a first buffer memory operating in "First In First Out" mode and able to temporarily contain said video data in packet form;
  a second buffer memory operating in "First In First Out" mode and able to temporarily contain said subtitle data in packet form;
  a demultiplexer configured to transmit said video data and said subtitle data respectively to said first and said second buffer memory; and
  a local clock,
  wherein said storage space comprises a storage space configured to store said PCR time references such that said demultiplexer transmits said PCR time references, said decoder including a generator configured to generate a presentation time stamp associated with each subtitle data packet not initially containing a presentation time stamp, said presentation time stamp being determined from a time reference value of a PCR time reference among said PCR time references and transmitted by said demultiplexer and enabling the presentation of said subtitle data packets to be synchronized with relation to said local clock;
  wherein the decoder further comprises a memory configured to store a time reference variable equal to the last time reference received from said multiplexer, said generator setting the value of said presentation time stamp of each subtitle data packet received in said second buffer memory at the current value of said time reference variable.

15. The decoder according to claim 14, comprising a memory configured to store a time reference variable equal to the last time reference received from said multiplexer, said generator setting the value of said presentation time stamp of each subtitle data packet received in said second buffer memory at the value that follows the current value of said time reference variable at the time of receipt of said packet in said second buffer memory.

16. The decoder according to claim 14, wherein the presentation time stamp is added into those subtitle data packets not initially containing a presentation time stamp and wherein those subtitle data packets with the presentation time stamp added are stored in the second buffer.

* * * * *